United States Patent [19]
Hausberg et al.

[11] 3,976,454
[45] Aug. 24, 1976

[54] EXHAUST SYSTEM FOR STEEL-MAKING PLANT

[75] Inventors: Gerhard Hausberg; Karl-Rudolf Hegemann, both of Essen, Germany

[73] Assignee: Gottfried Bischoff Bau kompl. Gasreinigungsund Wasserruckkuhlanlagen Kommandigesellschaft, Essen, Germany

[22] Filed: Feb. 19, 1975

[21] Appl. No.: 551,052

[30] Foreign Application Priority Data
Feb. 20, 1974 Germany............................ 2407998

[52] U.S. Cl................................ 55/226; 55/240; 55/257 R; 98/115 R; 261/DIG. 54; 261/116; 266/146; 266/159
[51] Int. Cl.²........................................ B01D 47/06
[58] Field of Search.................. 55/85, 93, 94, 222, 55/240, 226, 228, 257; 261/116, DIG. 54; 266/15, 35, 31; 75/60; 98/115

[56] References Cited
UNITED STATES PATENTS

| | | | |
|---|---|---|---|
| 3,655,361 | 4/1972 | Brown et al. | 266/35 |
| 3,726,065 | 4/1973 | Hausberg et al. | 55/226 |
| 3,844,745 | 10/1974 | Hausberg et al. | 55/DIG. 54 |
| 3,863,906 | 2/1975 | Vicard | 266/35 |

Primary Examiner—Bernard Nozick
Attorney, Agent, or Firm—Karl F. Ross; Herbert Dubno

[57] ABSTRACT

Dust-laden waste gases from a converter and from ancillary equipment are exhausted by respective blowers through a first and a second duct to a main and a secondary scrubbing station whence the purified gases escape through respective chimneys. The first duct is provided with two cascaded washing stages, the upstream stage being operable to throttle or block the flow of gases therethrough. An annular cowl for the interception of peripherally escaping converter gases is connected to a third duct which joins the first duct at a location between the two washing stages but is also connectable through a switching valve to the second duct. The switching valve is open in the blowing phase of the converter while a movable insert at the upstream washing stage unblocks the first duct; in the charging phase, the switching valve is closed and the insert at the upstream stage obstructs the first duct as the gases picked up by the cowl are drawn through the third duct and the downstream washing stage of the first duct for discharge through the chimney of the main scrubbing station.

6 Claims, 2 Drawing Figures

EXHAUST SYSTEM FOR STEEL-MAKING PLANT

FIELD OF THE INVENTION

Our present invention relates to a gas-purifying exhaust system to be used in a steel-making plant equipped with a converter.

BACKGROUND OF THE INVENTION

In our prior U.S. Pat. No. 3,844,745 we have disclosed a gas-purification system of this type comprising a main scrubbing station and a secondary scrubbing station in which gases to be purified are subjected to irrigation, the main scrubbing station receiving waste gases from an operating converter via a first duct whereas a second duct (or set of ducts) delivers waste gases from ancillary equipment to the secondary scrubbing station. A third duct, with an inlet positioned in the vicinity of the converter mouth, intercepts gases evolving during the charging thereof and directs them to the main scrubbing station which at that time is not utilized for the treatment of the converter gases themselves; this latter duct is selectively connectable, with the aid of a switching valve, to the secondary scrubbing station whereby airborne solids not exhausted by the first duct during a refining operation are extracted by the then not otherwise utilized (or underutilized) facility serving for the treatment of gases emitted by the ancillary equipment. Each duct is provided with individual irrigation means, including an upstream washing stage and a downstream washing stage in the first scrubbing station. The gases traversing the two scrubbing stations are subjected to the action of the respective irrigation means which are connected to a common source of wash water, such as a settling tank to which the effluents of both stations are led for recirculation of the liquid. This wash water is circulated in tandem through the two scrubbing stations, the effluent of the secondary station with its relatively minor load of contaminants being passed into the upstream washing stage in the main station whose downstream stage is supplied with fresh wash water directly from the source, as is a further washing stage located in the third duct. The first and third ducts merge within the main station downstream of their respective washing stages at the entrance of a common water separator.

OBJECT OF THE INVENTION

The object of our present invention is to improve the above-described system, with elimination of the further washing stage in the third duct and other simplifications, without materially altering its mode of operation.

SUMMARY OF THE INVENTION

In the improved system according to our present invention, the third duct opens into the first duct at a junction lying upstream of at least part of the irrigation means included in the main scrubbing station, this station also comprising flow-control means in the first duct at a location upstream of that junction for selectively blocking or at least throttling the first duct, ahead of its merger with the third duct, by moving the flow-control means from an unblocking position to an obstructing position. This operation, which substantially increases the flow resistance of the first duct in its section lying between its converter-side inlet and its junction with the third duct, enables a first exhaust means in the main scrubbing station to draw evolving gases from the vicinity of the converter, during a charging phase, through the third duct to a washing stage of the main scrubbing station whereby a second exhaust means, serving to draw gases from the ancillary equipment through the second duct, can be fully relieved of the task of aspirating charging gases from the converter during this phase by the closure of the aforementioned switching valve to disconnect the second and third ducts from each other.

Advantageously, pursuant to another feature of our invention, the flow-control means is part of an upstream washing stage of the main scrubbing station which, in contradistinction to the corresponding stage shown in our prior U.S. patent, is provided with a movable insert located in a substantially vertically descending nozzle portion of the first duct. If that portion is only throttled but not completely blocked in the obstructing position of the insert, water from an overlying spray head will flow to the duct junction at the lower end of this nozzle portion to prewet the gases arriving through the third duct.

BRIEF DESCRIPTION OF THE DRAWING

The above and other features of our invention will now be described in detail with reference to the accompanying drawing in which.

SPECIFIC DESCRIPTION

Figure 1:
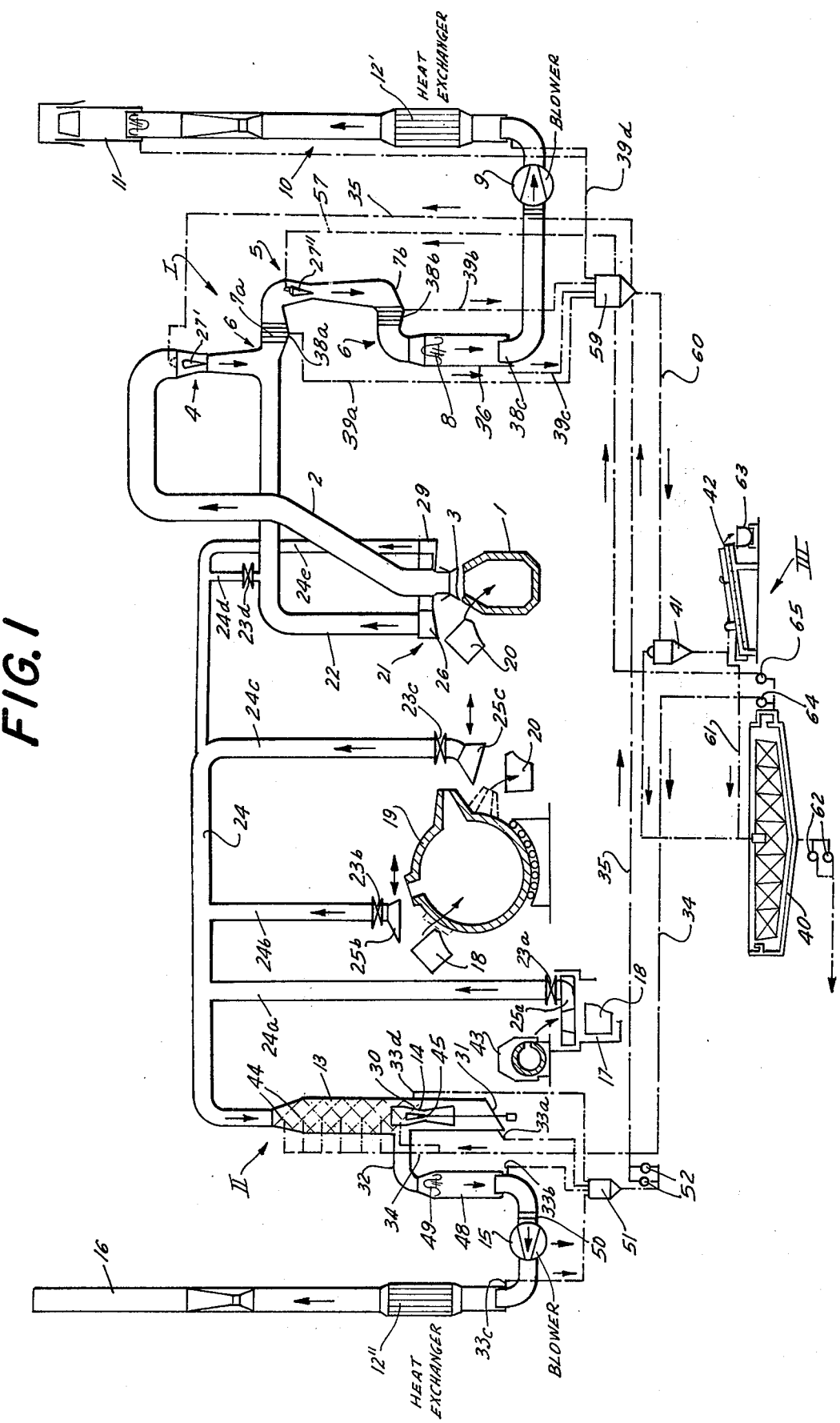
FIG. 1 is a somewhat diagrammatic overall view of a gas-purification and exhaust system embodying our invention.

The exhaust system show in FIG. 1 comprises a converter 1 tiltable into an off-normal (charging) position; this converter forming part of a steel-making plant further including such ancillary equipment as a transfer pit 17 and a mixer 19. Molten pig iron, transported in a railroad car 43, is poured into the pit 17 where it is received by a transfer ladle 18 serving to carry it to the mixer 19 for the admixture of additives therewith; the contents of the mixer are then emptied into a charging ladle 20 which dumps then into the converter. These steps occur, as is well known, at different times in the course of an operating cycle of the plant.

The mouth of the converter 1 in its normal upright position is overlain by a hood 3 opening into a first duct 2 which has a vertical pipe section in line with the converter axis; this vertical pipe section is surrounded by a downwardly open annular cowl 26 positioned to intercept gases rising around the duct 2. A second duct 24 has branches 24a, 25b, 24c whose entrance ends form hoods 25a, 25b, 25c overlying the pit 17, the loading side of mixer 19 and the unloading side of that mixer, respectively, to collect the rising gases. Cowl 26 opens at 21 into a third duct 22 which merges with duct 2 at a junction 6 within a main scrubbing station I. A fourth branch 24d of duct 24 is connected to duct 22, branches 24a – 24d being individually closable by slide valves 23a – 23d which are open only when the equipment concerned is in use, i.g. during loading and unloading of the mixer 19 in the case of valves 23b and 23c, respectively. A fifth branch 24e of duct 24 communicates at 29 with the cowl 26.

Duct 24 terminates at a secondary scrubbing station II including a blower 15 which draws the gases from its several branches through a wash tower 13 provided with a nozzle 14 downstream of a set of spray heads 44.

Figure 2:
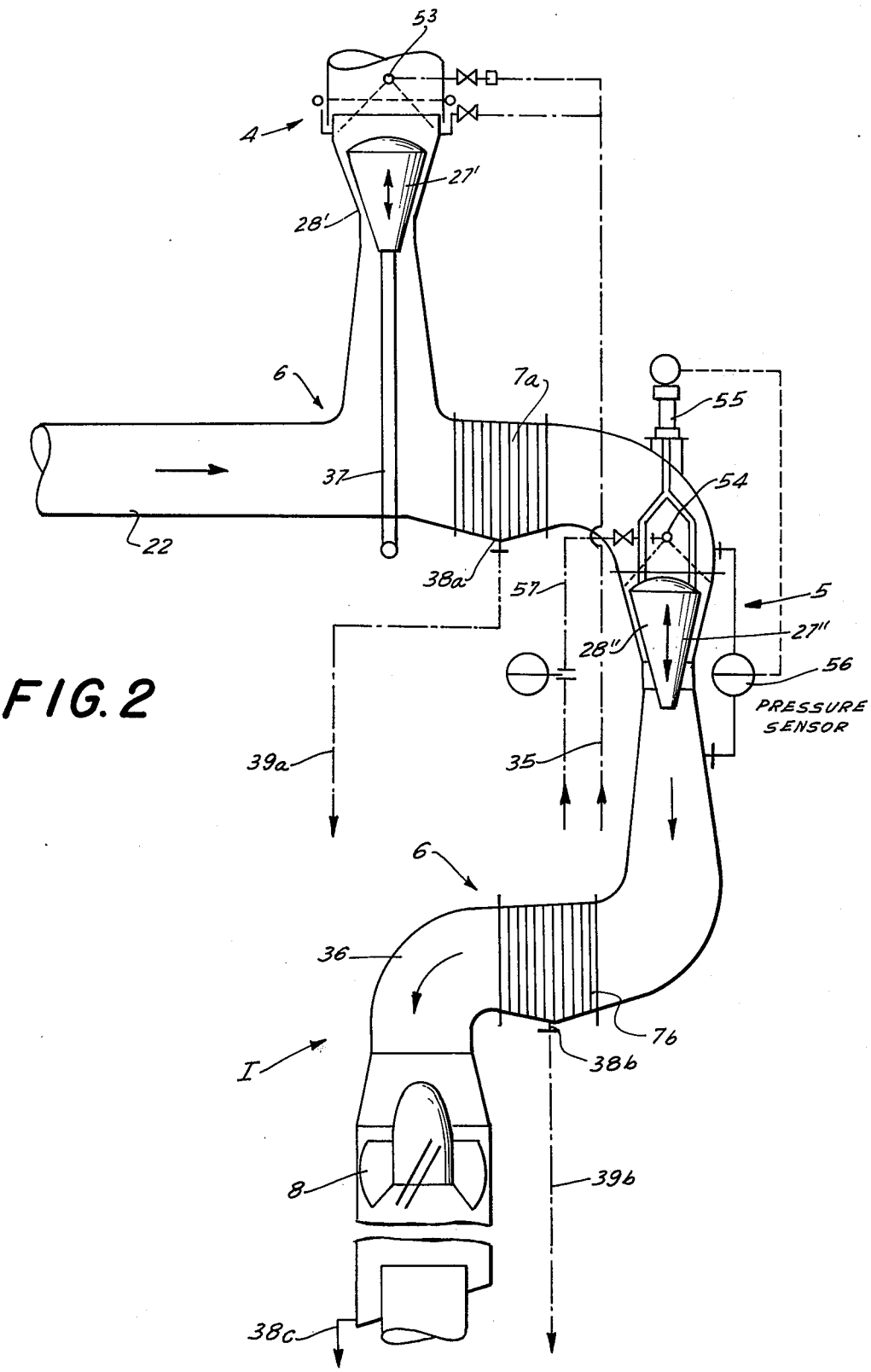
FIG. 2 is an enlarged detail view of a main scrubbing station included in the system of FIG. 1.

An insert 45 in nozzle 14 is vertically shiftable by a mechanism not shown, of the type described in our prior U.S. Pat. No. 3,727,365, under the control of a sensor responsive to the pressure differential between an upstream compartment and a downstream compartment separated by an inclined partition 30. The downstream compartment has a sloping bottom 31, provided at its lowest point with a drain 33a, and opens well above the lower end of nozzle 14 into a lateral outlet 32 whereby the wetted gases descending through nozzle 14 are sharply deflected to shed most of their entrained particles before escaping into a vortex chamber 48 provided with vanes 49 in which further separation between liquid and solids takes place. More liquid is drained off at 33b while the purified gas through a valve 50 and the blower 15 into a chimney or flue 16 which may open into the atmosphere and is shown provided with a heat exchanger 12″ for the recovery of residual thermal energy from the gas. Residual moisture is collected at a drain 33c whereas spent wash water from spray heads 44 runs off at 33d. All the drains 33a – 33d empty into a vessel 51 whose contents are fed by pumps 52 to a conduit 35 leading to an upstream washing stage 4 in duct 2 (see also FIG. 2). Stage 4, located in a descending vertical portion of that duct, comprises a spray head 53 above a constriction which forms a nozzle 28′ adapted to be selectively blocked or unblocked by a pear-shaped insert 27′ vertically displaceable therein. Insert 27′ is controlled, e.g. manually, via a stem 37 and in its unblocking position defines a relatively wide annular passage for the wetted gases with nozzle 28′. A downstream washing stage 5 in duct 2 comprises a spray head 54 just above a similar insert 27″ which is disposed in a nozzle 28″ formed by another constriction of duct 2. Insert 27″ is vertically adjustable by a mechanism 55 under the control of a sensor 56 responsive to the pressure differential across the constricted passage surrounding that insert.

In the blowing or refining phase of converter 1, nozzle 28′ is opened wide by the insert 27′ and switching valve 23d (FIG. 1) is open to interconnect the two ducts 22 and 24. The first blower 9 then aspirates the major part of the converter gases via duct 2 through the cascaded washing stages 4 and 5 while the second blower 15 draws the remaining gases, escaping laterally around the inlet of duct 2, via cowl 26 and ducts 22 and 24 through wash tower 3 on their way to flue 16. In the charging phase, with the converter tilted into its off-normal position, insert 27′ is lowered to throttle the duct 2 at nozzle 28′ and switching valve 23d in branch 24d is closed to disconnect the duct 22 from the duct 24; now, the suction of blower 9 draws the evolving gases from cowl 26 by way of duct 22 through washing stage 5 supplied with fresh wash water from a conduit 57. Duct 2 further includes baffle-type water separators 7a and 7b provided with drains 38a and 38b leading via conduits 39a and 39b to a collecting vessel 59. A further such conduit 39c extends from a drain 38c at the bottom of a vortex chamber 36 provided with vanes 8, this chamber serving as a water separator common to ducts 2 and 22. The gases freed from solids and from most of the liquid pass from water separator 36 through blower 9 into a flue 10 provided with a heat exchanger 12′ and with an additional vortex chamber 11; the latter chamber and other parts of the flue 10 are drained into vessel 59 by a conduit 39d.

The effluent from scrubbing station I, collected in vessel 59, exits therefrom via a conduit 60 terminating at a hydrycyclone 41 in a regenerating station III. The sludge precipitated in the cyclone is dried on a screen 42 from which the residual water is filtered out at 61 for delivery to a settling tank 40. The residual sludge collected in tank 40 is carried off by pumps 62 whereas solids retained by screen 42 can be removed by a bucket conveyor 63.

The supernatant liquid from tank 40 is recirculated by a pump 64 via a conduit 34 to the spray heads 44 of station II and by a pump 65 via conduit 57 to the spray head 54 of station I. The circulation of the wash water through scrubbing stations I and II in tandem, coupled with the recovery of a large portion of the spent water in settling tank 40, ensures a particularly economic mode of operation of our system.

With junction 6 located upstream of water separator 7a, the gases arriving at that separator via duct 22 in the charging phase are prewetted by water from spray head 53, flowing through the narrowed passage of nozzle 28′, and are freed from some of their entrained solids before reaching the washing stage 5.

We claim:

1. An exhaust system for a steel-making plant including a converter and ancillary equipment giving rise to dust-laden waste gases, comprising:

a main scrubbing station provided with a first duct originating at said converter and with first exhaust means for aspirating waste gases from said converter during operation thereof through said first duct;

first irrigation means including an upstream washing stage and a downstream washing stage in said first duct for purifying the waste gases aspirated from said converter;

flow-control means in said first duct operable to obstruct same at a location upstream of said downstream washing stage;

a secondary scrubbing station provided with a second duct originating at said ancillary equipment and with second exhaust means for aspirating waste gases from said ancillary equipment through said second duct;

second irrigation means in said second duct for purifying the last-mentioned waste gases;

a third duct with an inlet positioned in the vicinity of the converter outlet for intercepting gases evolving during charging of the converter, said third duct opening into said first duct at a junction between said upstream washing stage and said downstream washing stage;

a connection extending from said third duct to said second duct including valve means for enabling intercepted gases from said converter to be drawn by said second exhaust means via said third and second ducts through said second irrigation means; and actuating means for selectively displacing said flow-control means between an unblocking position and a throttling position whereby said intercepting gases can be drawn by said first exhaust means via said third and first ducts through said downstream washing stage in a charging phase of the converter.

2. A system as defined in claim 1, further wherein said valve means is operable to isolate said third duct from said second duct in said charging phase.

3. A system as defined in claim 1 wherein said flow-control means is part of said upstream washing stage.

4. A system as defined in claim 3 wherein said first duct has a substantially vertically descending nozzle portion terminating at said junction, said flow-control means including a vertically movable insert in said nozzle portion.

5. A system as defined in claim 4 wherein said upstream washing stage comprises spray means above said insert, the latter allowing water from said spray means to reach said junction in said obstructing position.

6. A system as defined in claim 5, further comprising a water separator in said first duct between said junction and said downstream washing stage.

* * * * *

UNITED STATES PATENT AND TRADEMARK OFFICE
CERTIFICATE OF CORRECTION

PATENT NO. : 3 976 454
DATED : 24 August 1976
INVENTOR(S) : Gerhard HAUSBERG ET AL.

It is certified that error appears in the above–identified patent and that said Letters Patent are hereby corrected as shown below:

IN THE SPECIFICATION

Col. 3, line 3, change "3,727,365" to -- 3,726,065 --

Col. 3, line 15, after "gas" insert -- passes --

Col. 3, line 47, change "3" to -- 13 --

Col. 4, line 21, change " solds" to -- solids --

Signed and Sealed this

Second Day of May 1978

[SEAL]

Attest:

RUTH C. MASON
Attesting Officer

LUTRELLE F. PARKER
Acting Commissioner of Patents and Trademarks